Figure 1:
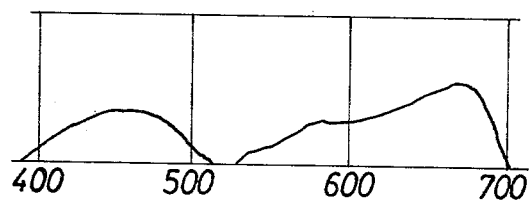

July 20, 1965  J. GÖTZE  3,196,017
SENSITIZING DYES FOR PHOTOGRAPHIC SILVER HALIDE EMULSIONS
Filed March 19, 1962

INVENTOR.
JOHANNES GÖTZE
BY
Connolly and Hutz
his ATTORNEYS

United States Patent Office 3,196,017
Patented July 20, 1965

3,196,017
SENSITIZING DYES FOR PHOTOGRAPHIC SILVER HALIDE EMULSIONS
Johannes Götze, Cologne-Stammheim, Germany, assignor to Agfa Aktiengesellschaft, Leverkusen, Germany, a corporation of Germany
Filed Mar. 19, 1962, Ser. No. 180,754
Claims priority, application Germany, Mar. 22, 1961, A 37,024
6 Claims. (Cl. 96—106)

This invention relates to sensitizing dyes with improved properties as well as to photographic silver halide emulsions being sensitized with said dyes.

It is known that excellent sensitizers are to be found among the previously described symmetrical thiocarbocyanines and selenocarbocyanines alkylated in the meso-position of the methine chain and in particular among the corresponding asymmetrical thio- or seleno- or thioseleno-carbocyanines. On account of their constitution, the absorption maxima of the prior known thiocarbocyanines and seleno-carbo-cyanines lie within a certain range, which can certainly be broadened by the various possibilities of substitution of the benzthiazole or benzelenazole ring (for example methyl, ethyl, alkoxy, aryl, halogen, carboxy, amino or substituted amino groups), but can still not be arbitrarily broadened.

It is also known that the maximum of sensitization is in most cases displaced by about 40 to 50 m$\mu$ towards longer wave length with respect to the absorption maximum. With particularly valuable dyestuffs which have an extraordinary sensitization maximum (also referred to as sensitization of second order), the difference between the absorption maximum, measured in alcohol, and the sensitization maximum is up to 100 m$\mu$.

The sensitization maxima of the best thiocarbocyanines and selenocarbocyanines and of the asymmetrical thioselenocarbocyanines with the prior known substituents are in the region of 650 to 655 m$\mu$ and it is scarcely possible to displace the sensitization maxima beyond this limit towards longer wave length. On the other hand, however, it is important for various purposes in the sensitization art to produce photographic emulsions which are especially highly red-sensitive, which have a sensitization maximum on the other side of the said range which falls off as steeply as possible towards the long-wave range. Furthermore, numerous dyestuffs from the many different cyanine dyestuff classes are known which sensitize at about 700 m$\mu$, for example substituted pinacyanoles or 5,5-diethylamino-indocarbocyanine (German Patent 625,181). Among the more recent groups of dyestuffs, reference is for example to be made to the dyestuffs referred to in German specification 1,082,118. Merocyanines, for example tetramethinemerocyanines, also sensitize in this range, and in addition sensitization can be effected in this range with rhodacyanines.

However, all these dyestuffs show disadvantages as opposed to trimethine dyestuffs (carbocyanines). Thus, merocyanines cannot be satisfactorily used in silver bromide or silver iodide emulsions and the pinacyanoles show a strong tendency to fogging. Trimethine cyanines frequently also show sensitization maxima of second order in emulsions of highest possible sensitivity, while this is not the case with sensitizing dyestuffs from other classes. Trimethine cyanine sensitizations of second order have a sensitization curve which falls off too steeply towards the long-wave range; their intensity is therefore very high, but only in the required range, whereas the aforementioned dyestuffs from other classes have broad sensitization ranges, and this for example makes them unsuitable for color photography purposes.

An object of the present invention is to provide new asymmetrical trimethine cyanine dyes which are substituted at the central carbon atom and which contain a naphthselenazole group. A further object is to provide a photographic element comprising an emulsion sensitized with the chain-substituted naphthselenazole-trimethine-cyanine-dyes. Other objects and advantages of the invention will become apparent by reference to the following specification in which details and embodiments are described. Dyestuffs containing a naphthselenazole group are the subjects of several patents. For example symmetrical naphthselenazole-carbocyanine which is not chain-substituted is described in the British Patent 354,264. Naphthseleno-monomethine-dyes are described in the U.S. Patent 2,339,094. All these dyestuffs, however, are of no value as sensitizing dyestuffs for photographic silver halide emulsion layers. Symmetrical mesoalkylated naphthselenazole-carbo-cyanines are unknown. It has now been found that asymmetrical mesoalkylated trimethine cyanines have an extraordinary maximum at about 680 m$\mu$ and are suitable for sensitizing photographic emulsions for the long-wave range. The compounds according to the invention are characterized by the following formula:

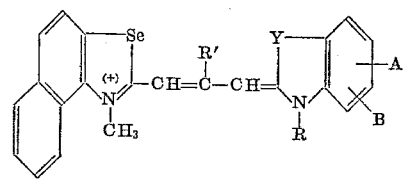

wherein
Y represents S or Se;
A stands for alkyl, alkoxy in the 5-position or 6-position, phenyl, thienyl, halogen in the 5-position or 6-position;
B represents hydrogen, alkoxy, the divalent group —OCH$_2$O— or a benzene ring condensed thereon;
R' stands for methyl or ethyl and
R stands for —(CH$_2$)$_3$SO$_3$$^{(-)}$ or —(CH$_2$)$_4$SO$_3$$^{(-)}$ The dyestuffs according to the invention have absorption maxima up to about 600 m$\mu$ and intensive sensitization maxima at 670 to 680 m$\mu$ with a steep descent towards the long-wave range.

They are compatible with color components and are especially suitable for highly sensitive silver bromide emulsions. The dyestuffs can be prepared by reaction of the naphthselenazole quaternary salt with quaternary salts of omega-methylthio-omega-alkylvinyl-substituted heterocyclic nitrogen compounds having the following formula:

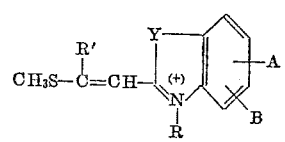

as described in detail, for example in German patent specification 1,072,765 (Agfa).

Various methods are known for the production of 2 - methyl - naphthselenazole(2 - methyl - 4,5 - benzo-benzselenazole) for example the process described in U.S. Patent 2,339,094. Furthermore the base can be prepared analogous to the known preparation of 2-methyl-benzselenazole using 1-nitro-2-aminonaphthalene (Beilstein Handbuch, vol. 12, page 13) as starting compound.

This base is diazotized and a solution of potassium selenocyanide is added to the exactly neutralized solution of the diazo compound. In this way, a compound of the formula

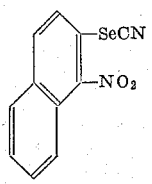

is formed. This product is dissolved in dilute sodium hydroxide solution, reduced with sodium hyposulfite and oxidized with $H_2O_2$ to the diselenide:

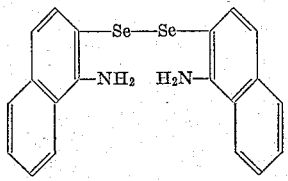

By boiling this diselenide for several hours with acetic acid anhydride and powdered zinc, the required base is formed, M.P. 108° (recrystallized from methanol). The quaternization of the base is described in Example 1.

*Example 1*

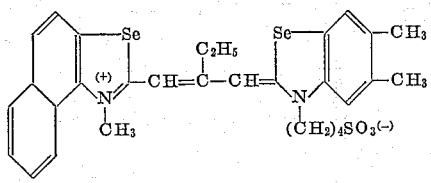

*Preparation.*—10 g. of 2-methyl-naphthselenazole are heated with 6 g. of dimethyl sulphate for 2 hours to 120°. Acetone is added to the reaction mixture and this kept for several days in a refrigerator. The quaternary salt is crystallized out and can be suction-filtered. The yield is about 10–11 g. 10 g. of this salt, with 13 g. of a compound of the following formula

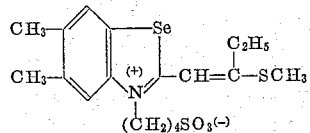

which is obtained in accordance with the instructions given below are dissolved in 100 cc. of ethanol, 6 cc. of triethylamine are added thereto and the mixture is heated for 8 hours to 60°. The reaction mixture is poured into water, the semi-solid mass is triturated with ether and, after pouring off the ether, isopropanol is added. After a few days, the dyestuff has crystallized and can be suction-filtered. It is recrystallized from a mixture of methanol and chloroform. Melting point: 262°; abs. max. 595 mµ.

The benzselenazole derivative was prepared as follows (compare German Patent 1,072,765):

36 g. of 2,5,6-trimethylbenzselenazole are quaternized for 35 minutes with 23 g. of butanesultone at 120° C. About 45 g. of the butanesultone salt are obtained.

36 g. of this salt are suspended in 190 cc. of propionic acid anhydride, decomposed with 36 cc. of triethylamine and stirred for 3 hours at 90° C. The solvent is then distilled off in vacuo. 80 cc. of water are added to the residue, which is cooled and the 5,6-dimethyl-2-propionyl-methylene-benzselenazoline - N - butane sulphonic acid is precipitated with 8 cc. of concentrated hydrochloric acid.

23 g. of this ketone are boiled in chloroform (180 cc.) with 18 g. of $P_2S_5$ and 24 cc. of triethylamine. The chloroform solution is shaken with water, the chloroform is dried and evaporated. The semi-solid residue is dissolved in 100 cc. of $H_2O$ and 16 cc. of dimethyl sulphate are added thereto. After completing the reaction, 250 g. of acetone are added the main quantity of the water is removed with $Na_2SO_4$, the acetone is evaporated and the residue is dried in a vacuum desiccator. The semi-solid benzselenazole derivative solidifies with addition of isopropanol. Yield: 18 g.; M.P.: 205–207° C.

*Photographical application.*—For sensitizing a color negative emulsion which contains a blue-green color coupler (color coupler F 654, which is the sodium salt of N - (2 - [N - methyl - N - octadecylamino] - 4 - sulfophenyl)-1-hydroxy-2-naphthamide) 60 mg. of the dyestuff described above are used for 1 litre of emulsion.

The special sensitivity curve of an emulsion treated in this way is shown in FIG. 1.

*Example 2*

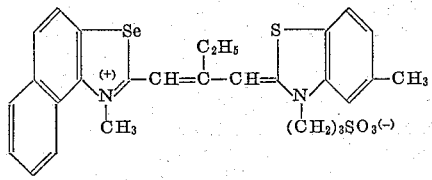

*Preparation.*—10 g. of 2,3-dimethylnaphthselenazole methylsulphate and 10 g. of a compound of the following formula

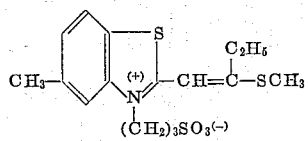

(for the preparation thereof, see German Patent 1,072,765, Example 3, lines 8–41) are heated in 180 cc. of ethanol. The salts are almost completely dissolved. The solution is introduced into a round-bottomed flask with a stirrer device, 5 cc. of triethylamine are added and stirring takes place for about 6 hours at 40 to 50°, the substance is allowed to cool overnight at room temperature and the precipitate separated out is suction-filtered. The residue is washed with methanol, ethanol, ether and water and recrystallized from a mixture of chloform and methanol. A copper-coloured powder is formed, which has a melting point of 290°.

Figure 2:
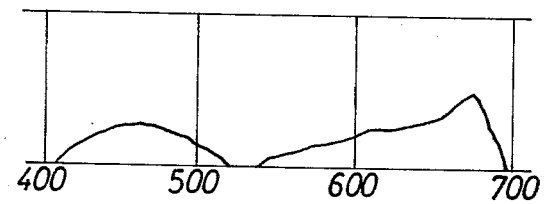

*Photographical application.*—In order to sensitize a highly sensitive silver bromoiodide emulsion (Isopan emulsion) 40 mg. of this dyestuff is used per litre of emulsion. The spectral sensitivity curve of an emulsion treated in this way is shown in FIG. 2.

*Example 3*

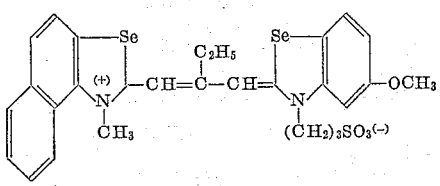

*Preparation.*—This dyestuff is prepared in the same way as in the examples previously described from 2,3-dimethyl-4,5-benzobenzselenazole-methylsulphate (preparation, see Example 1) and an intermediate product of the formula

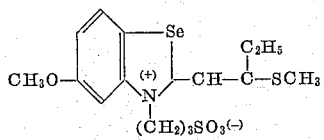

(The preparation corresponds to Example 4 of German Patent 1,072,765, M.P. 226°.)

*Photographical application.*—The dystuff has an absorption maximum at 595 mμ. for an emulsion which contains a blue-green component (see Example 1), it has a sensitization maximum at 680 mμ.

*Example 4*

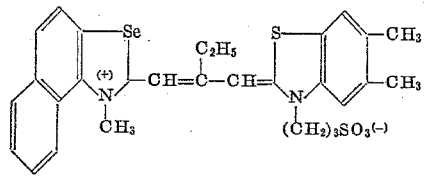

The dystuff has an absorption maximum at 585 mμ and melts at 302°. It represents an exceptionally effective sensitizer for highly sensitive silver bromoiodide. When added in quantities of 50 to 80 mg. to a silver bromoiodide emulsion which is ready for casting, it shows a sensitization maximum at 675 mμ. It can moreover be added to emulsions which contain colour couplers, such as mentioned in Example 1, or as described in German specification 1,070,030.

The quantities added are in this case preferably 60 to 80 mg. per litre of emulsion. The very strong sensitization maximum is in the region of 680 mμ.

*Example 5*

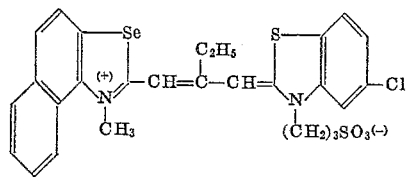

The dyestuff has an absorption maximum at 585 mμ and a melting point of 285°. Highly sensitive silver bromoiodide emulsions containing colour couplers (see Example 4) are very strongly sensitized with a maximum at 676 mμ. 60 to 80 mg. of dyestuff per litre of emulsion ready for casting are preferably used.

*Example 6*

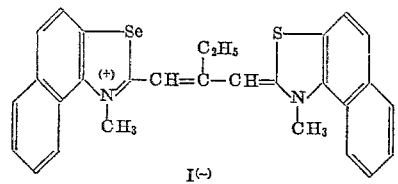

The dyestuff having an absorption maximum at 590 mμ, is prepared by 3 g. of the quaternary salt described in Example 1 being suspended with 3.6 g. of the intermediate product

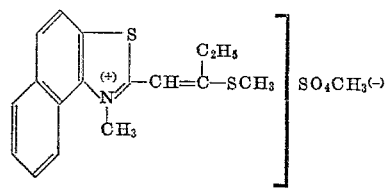

in about 300 cc. of ethanol and being stirred for several days at about 50° in the presence of 3 cc. of triethyl amine. The reaction mixture is poured into dilute potassium iodide solution and the precipitate is suction-filtered after 24 hours. A black residue is left on the filter. This is formed into a paste with methanol and triturated with pyridine. After sometime, the initially viscous mass becomes crystalline and can be suction-filtered. When washed with pyridine and recrystallized from methanol, the dyestuff precipitates as fine green needles. The dyestuff has a sensitization maximum at 680 mμ.

In the preparation of emulsions containing the sensitizers according to the invention the sensitizing dyes may be added to the emulsion in form of a solution. Suitable solvents as indicated in the examples are the alcohols for example methyl or ethyl alcohol which may be anhydrous or diluted with a small volume of water. In actual practice the sensitizing dyes are applied to the emulsion during any stage of its production, however, they are preferably added to the finished emulsion before being cast.

While there have been pointed out above certain preferred embodiments of the invention the same is not limited to the foregoing examples or to the specific details given therein but are capable of variations and embodiments as to the reactions, proportions and conditions employed. The silver halide of the emulsions to be sensitized with the dyes according to the invention may consist of silver chloride, silver bromide, silver iodide or mixtures thereof. As binding agent for the silver halide emulsion any water permeable product such as polyvinyl alcohol, carboxy methyl cellulose, alginate or preferably gelatine can be used.

What is claimed is:

1. A photographic silver halide emulsion which contains a cyanine dye having the following formula

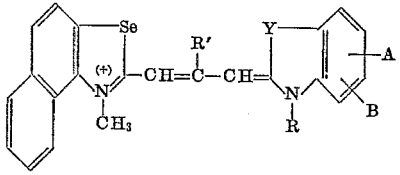

wherein Y represents a member selected from the class consisting of sulfur and selenium, A represents a substituent selected from the class consisting of alkyl, alkoxy, phenyl, thienyl and halogen radicals in respectively the 5 and 6 positions of the heterocyclic nucleus, B is a substituent of the group consisting of hydrogen and methyl in respectively the 5 and 6 positions of the heterocyclic nucleus, R' is a lower alkyl radical and R is a radical of the group consisting of —$CH_2CH_2CH_2SO_3^{(-)}$ and —$CH_2CH_2CH_2CH_2SO_3^{(-)}$.

2. A photographic silver halide emulsion which contains a cyanine dye having the following formula

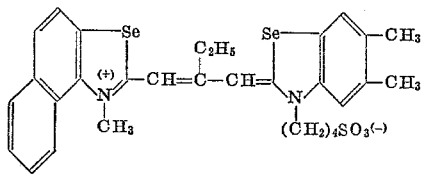

3. A photographic silver halide emulsion containing a cyanine dye having the following formula

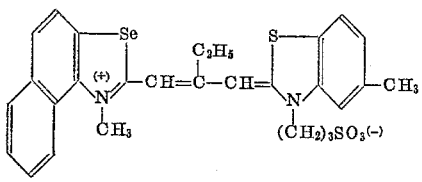

4. A photographic silver halide emulsion containing a cyanine dye having the following formula

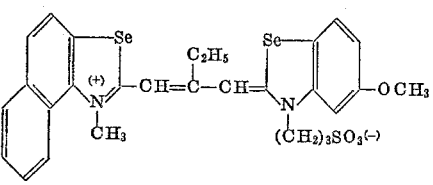

5. A photographic silver halide emulsion containing a cyanine dye having the following formula

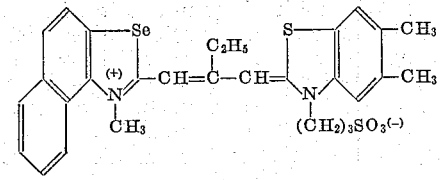

6. A photographic silver halide emulsion containing a cyanine dye having the following formula

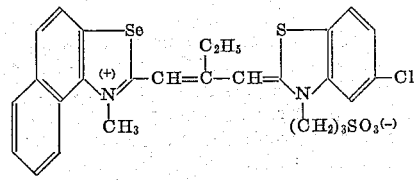

References Cited by the Examiner

UNITED STATES PATENTS

| | | | |
|---|---|---|---|
| 2,112,140 | 3/38 | Brooker et al. | 96—106 |
| 2,378,783 | 6/45 | Nawiasky et al. | 96—106 |
| 2,475,949 | 7/49 | Cressman | 96—106 |
| 2,776,280 | 1/57 | Brooker et al. | 96—106 |
| 2,921,067 | 1/60 | Larive et al. | 96—106 |

FOREIGN PATENTS

| | | |
|---|---|---|
| 792,280 | 3/58 | Great Britain. |
| 1,072,765 | 1/60 | Germany. |

OTHER REFERENCES

Glafkides: "Photographic Chemistry," vol. 2, pages 820–2 and 828, Fountain Press, London (1960).

NORMAN G. TORCHIN, *Primary Examiner.*